United States Patent Office 3,387,948
Patented June 11, 1968

3,387,948
PREPARATION OF ALKALINE EARTH METAL ALUMINUM HYDRIDES
John C. Snyder, Darling, Pa., assignor to Hercules Incorporated, a corporation of Delaware
No Drawing. Filed Mar. 30, 1962, Ser. No. 183,765
5 Claims. (Cl. 23—365)

This invention relates to an improved process for the preparation of metal hydrides and more particularly to the preparation of the alkaline earth metal hydrides from the metals and hydrogen.

The alkaline earth metal hydrides and their aluminum hydride complexes are valuable reducing agents and chemical intermediates for many chemical reactions. While it is known that metal hydrides can be prepared by hydrogenation of the corresponding metal, the reaction requires high temperatures and pressures and generally results in only low or mediocre yields. Even more difficulty is encountered in the production of the alkaline earth metal aluminum hydrides. These have previously been prepared by reacting an aluminum halide with the corresponding alkaline earth metal hydride. However, this method wastes three moles of alkaline earth metal for every mole of alkaline earth metal aluminum hydride produced. Obviously, if these alkaline earth metal aluminum hydrides could be produced in one step from the elements, great savings could be accomplished, but here again yields have been low.

The syntheses of the alkaline earth metal hydrides and the mixed metal hydrides from the elements involves the reaction of gaseous hydrogen with a solid metal when producing the simple metal hydrides and in the case of the mixed metal hydrides, gaseous hydrogen must be reacted with mixtures of solid metals. These reactions between gases and metals, particularly to produce solids which are practically insoluble, or of very limited solubility, are mechanistically difficult and slow in absolute rate. They involve diffusion of hydrogen to the active reacting center of the metal surface, subsequent reaction, and formation of a solid product, which by its very presence impedes further reaction, particularly when it is insoluble, or of very limited solubility in any medium which can be used for reaction. The overall effect is for such reactions to occur to a very limited degree, and to be impeded from further progressing by the shielding of the surface by previously formed product.

Another difficulty in these reactions between metals and hydrogen resides in the fact that adherent surface coatings of oxide, or in some cases of nitride, practically prevent initial reaction. While such layers can generally be removed or minimized by comminution, such as by premilling in a so-called "inert" medium or atmosphere, the active metal surface frequently welds or rewelds to other similar surfaces, unless protected by some adsorbed species. The adsorbed species may subsequently deter reaction with hydrogen.

Now in accordance with this invention it has been found that the alkaline earth metal hydrides and their mixed metal hydrides may be synthesized under milder conditions, in shorter reaction times, and in higher conversions, and frequently to give a more reactive product, when the synthesis reactions between hydrogen and the metal or metals, or between hydrogen, metal and metal hydride is carried out in such a fashion that the reactants and products are continuously or intermittently subject to comminution during the reaction.

Such comminution may be carried out in a reactor rotating about a horizontal axis, or an axis at some angle with the horizontal. Since such reactions are invariably pressure reactions, continuous connection to the gage and pressure system may be provided by a suitable inlet through the axis, and suitably provided with a packing to prevent leakage. In such cases, the reactor is packed with generally spherical balls, such as of steel, in size or mixed sizes such as are generally employed in the art of ball-milling.

A more convenient and generally preferred type of comminution reactor consists of a high pressure autoclave, with such pressuring, gaging, filling and emptying ports as may be necessary, but more specifically characterized by having a shaft and agitator so arranged as to continuously move and agitate a moving bed of balls or other attriting media. One such particularly convenient arrangement is to provide the pressure vessel, of generally cylindrical dimensions with the axis vertical, with a shaft driving an arrangement of paddles. This shaft should most conveniently be provided with a series of paddles, staggered on the shaft, both with respect to height and angular positioning on the shaft. Further, these paddles should best be of such dimensions that the outer edges reach to within a distance equal to the radius of the smallest balls used in attriting. Similarly the paddles should be pitched on the shaft in such a manner as to impart both a tangential and a vertical component to the balls. Furthermore, the bottom paddle should be of similar specifications so as to continually sweep the bottom of the reactor relatively free of balls, and chemical species involved in the reaction. By adhering to the specification that the paddles approach the walls to within a radial distance of the smallest balls, the device will not become wedged or fouled. These dimensional limitations are particularly desirable where the internal diameter of the reactor is less than twenty times the average diameter of the balls. In height, the dimensions may be of any convenient value.

With reactors having diameters larger than about fifteen times the average ball diameter, due to machining difficulties and wear during use, it is frequently more desirable to provide a considerably larger clearance between the outer edge of the paddle and the reactor wall. In such cases, it has been found that a clearance in excess of 2.5 average ball diameters (5 average radii) is conducive to proper operation.

It has further been found that in accordance with this invention the direct synthesis of the alkaline earth metal hydrides and the mixed alkaline earth metal aluminum hydrides can be carried out more rapidly, under milder conditions, to a greater conversion or to give more reactive products, or a combination of these, if, in addition to ball milling during the reaction, such syntheses are carried out in the presence of catalysts comprising transition metals or their compounds, or if such catalyst materials are mixed or alloyed with the original metal or metals. Thus, in accordance with this invention, any transition metal, metal hydride, or metal halide can be used to catalyze the synthesis of metal hydrides or mixed metal hydrides from the elements. The transition metals, or their compounds, that may be so used are the metals of Groups IV-B, V-B, or VI-B of the Periodic Table, which groups include titanium, zirconium, hafnium, vanadium, niobium, tantalum, chromium and molybdenum. The transition metal may be used as the free metal, or mixed or dissolved in the reacting metal. Exemplary of the compounds of these metals that may be used are titanium hydride, titanium tetra-, tri-, and dihalides such as the chlorides, bromides and iodides, the corresponding compounds of zirconium, vanadium tetra-, tri- and dihalides such as the chlorides and bromides, tantalum penta- and trichlorides and bromides, chromic chloride and bromide, chromous chloride and iodide, molybdenum di-, tri-, tetra- and pentachlorides, etc.

Just how the transition metals or their compounds act as catalysts is not known. When the metal halides are used as the catalyst, they are generally reduced to the free metal, or to hydrides which may be nonstoichiometric compounds. It is believed that one means by which such catalysts may be effective is through their hydrides, which act as hydrogen transfer agents. However, it may be that the action is through some embrittling process which permits ready deterioration of the metal lattice structure during reaction with hydrogen. In any event, the transition metals and their compounds do effect a true catalytic action in making possible milder conditions and/or greater conversions. Since it is a catalytic action, only a catalytic amount of the transition metal or transition metal compound is needed. Generally an amount of from about 0.5% to about 10%, based on the weight of metal or metals being hydrogenated, is used. Higher amounts can, of course, be used, but generally do not further augment the reaction.

As has already been pointed out above, the process in accordance with this invention can be used for the preparation of any alkaline earth metal hydride, as for example, beryllium hydride, magnesium hydride, calcium hydride, etc., and for the preparation of the aluminum hydride complexes thereof, i.e. the alkaline earth metal aluminum hydrides such as magnesium aluminum hydride [$Mg(AlH_4)_2$] and calcium aluminum hydride [$Ca(AlH_4)_2$], etc.

Since some of these hydrides are more stable than others, the reaction conditions such as temperature and hydrogen pressure will be varied accordingly. The upper limiting conditions are, in general, complicated relationships between temperature and hydrogen pressure which are in turn related to the stability of the individual hydride. Thus, it is possible to operate, in a given hydride synthesis, at a higher temperature, and thus obtain higher reaction rate, provided the hydrogen pressure is sufficiently raised to prevent the reverse decomposition reaction. With less stable hydrides, a lower temperature and a higher pressure are advantageous, while in the synthesis of more stable hydrides higher temperatures may be tolerated. However, except where secondary solvent reactions with hydrogen may occur, generally higher pressures are more conducive of higher reaction rates, although when employing the teachings of this invention, less drastic reaction conditions will be needed for given results than when employing other procedures. For the more stable metal hydrides, the lower limit of hydrogen pressure may be as low as a few atmospheres, and the hydrogen pressure may extend upward to a thousand atmospheres with the more difficulty synthesized hydrides. In general, the pressure will be within the range of from about 500 p.s.i. to 10,000 p.s.i. of hydrogen pressure, and more preferably from about 1000 p.s.i. to about 5000 p.s.i., and the temperature will be within the range of from about 80° C. to about 450° C. and more preferably from about 100° C. to about 200° C.

The process of this invention is advantageously carried out in the presence of an inert, liquid, organic diluent as a solvent or slurry vehicle. For the synthesis of the alkaline earth metal hydrides, there is no inert, liquid diluent which is a suitable solvent for the product. In these cases, such as hydriding magnesium, the reaction is readily carried out using any organic liquid which is inert under the reaction conditions, i.e. resistant to hydrogenation, hydrogenolysis, or reduction by the product hydride. Exemplary of such vehicles that may be so used are liquid saturated aliphatic hydrocarbons, as for example, hexane, n-heptane, octane, etc., or any of the commercial mixtures of saturated aliphatic hydrocarbons.

In the case of the alkaline earth metal aluminum hydrides which are at least partially soluble in some diluents it is possible to carry out the syntheses in such diluents as well as in the saturated aliphatic hydrocarbons mentioned above. Generally these diluents will be electron donor compounds which are inert under the reaction conditions, i.e. are resistant to hydrogenation, hydrogenolysis, or reduction by the intermediate or final hydrides, and which at the same time provide the desirable solubility characteristics. Typical diluents having such characteristics are, for example, aliphatic and cyclic ethers such as diethyl ether, methyl ethyl ether, methyl propyl ether, di-n-propyl ether, dioxane, tetrahydrofuran, etc.; polyethers, such as diethylene glycol dimethyl ether, triethylene glycol dimethyl ether, triethylene glycol diethyl ether, etc., aliphatic and cycloaliphatic tertiary amines such as trimethylamine, triethylamine, tri-n-butylamine, triamylamine, tri-n-hexylamine and other trialkylamines; dialkylcyclohexylamines such as dimethylcyclohexylamine, diethylcyclohexylamine, etc. Obviously, mixtures of any of these diluents can be used and in some cases may be desirable.

When employing solvents or slurry vehicles, it is generally advisable to operate with the metal or hydride reactants at as high a concentration as possible to obtain highest production from a given piece of equipment. However, there is always an upper limit of solution concentration or slurry vehicle concentration, caused by limited solubility or by a concentration above which effective milling is difficult. These will range from a low of a few percent to an upper limit which is generally less than about 30% solids, and preferably will be within the range of from about 5 to 20% solids.

It is generally desirable to charge the metal or metal hydride reactants in a form of previous subdivision, rather than as massive materials. This is advantageous from the standpoint of introducing the material through the usually restricted diameter of high pressure connections, but particularly because it minimizes the comminution which must be done in the mill reactor itself. For example, aluminum may be previously subdivided by atomizing in air or with an inert gas. Filings or other finely divided metals may of course be employed. It is particularly advantageous to have previously milled the metal externally, in a suitable inert vehicle, and suitably protected from oxidation, and sometimes with traces of protective "getters" to minimize oxidation. Previous milling renders the metal to a form of flat leaflets with a maximum of surface, and a surface which remains relatively constant during subsequent reaction until the individual particle relatively suddenly disappears. Milling, before and during reaction, serves to provide a maximum constant rate during the whole reaction time.

The alkaline earth metal hydrides and the mixed alkaline earth metal aluminum hydrides, and specifically those produced by this invention, may be used in a variety of ways known to the chemical and technological industries. In particular, hydrides, such as magnesium hydride may be employed as reducing agents for organic functional groups, where it is desirable to obtain specific results, or where the use of hydrogen under pressure with catalysts is not desired. Several of the mixed metal hydrides such as magnesium aluminum hydride have very wide application as special purpose reducing agents, and they may also be used as solid propellant fuels when combined with suitable oxidizers, by which relatively high specific impulses are obtained.

The following examples will illustrate the process of this invention. All parts and percentages are by weight unless otherwise specified.

Examples 1–9

In each of these examples, the reaction was carried out in a mill reactor which was a 3-quart high pressure steel reaction vessel of cylindrical internal dimensions, and rated for operation at 5000 p.s.i.g. at 300° C. It was provided with means for pressuring with hydrogen, thermocouple for measuring the temperature of the reaction, and a vertical agitator which had four paddles in staggered position on the agitator shaft. Each paddle was tilted at 15° with the vertical so as to impart a vertical as well as a tangential component to the balls. The reactor was filled approximately two-thirds full with steel balls of ⅜ inch diameter. For each run, the reactor was evacuated and filled with nitrogen.

The mill reactor was charged with the given weight of metal, powdered or granular magnesium in Examples 1–7 and 9, and chipped calcium turnings in Example 6, and then with 700–800 ml. of anhydrous n-heptane as the diluent. The catalyst, if one was used, was also charged at this time. In Examples 1, 3, 5 and 9 the mixtures were milled for 2 hours at room temperature and then were heated, with continued milling, to the reaction temperature at which point hydrogen pressure was applied. In Example 2, the mixture was milled for 2 hours under 1 atm. of hydrogen and then heated to the reaction temperature and hydrogen pressure applied. In Examples 4 and 7 the reactor contents were not pre-milled at room temperature but were milled during a 1.5 or 1.3 hour, respectively, heat-up to the 150° C. reaction temperature. In Examples 6 and 8 the reactor contents were not milled prior to reaching the reaction temperature, at which point milling was begun and hydrogen pressure applied. The hydrogen pressure was maintained by repressuring as necessary during the runs, and the runs were stopped when no further pressure drop was observed, except in Example 9 when the reaction was stopped after 4 hours. The reactor contents were then cooled, the reactor vented, flushed with nitrogen and the contents transferred under nitrogen to a receiver. The percent conversion was determined by analysis of the product slurry.

The control run was carried out by charging the magnesium powder and 800 ml. of anhydrous n-heptane to the reactor mill as above and milling the contents at room temperature for 6 hours. The contents were then transferred to a 1000 ml. high pressure autoclave; and with vigorous gas dispersion and agitation, the mixture was hydrogenated for 6 hours at 4000 p.s.i.g. and 150° C. Analysis of the product showed that without milling during the reaction only 18% of the magnesium had been converted to the hydride.

Tabulated below is the data for the control run and for each of the examples.

After milling for 3 hours at room temperature in a hydrogen atmosphere, the mixture was hydrogenated at 4000–4500 p.s.i. hydrogen at a temperature of 120° C. for 8 hours. The conversion to magnesium aluminum hydride was 10%, and the remaining magnesium was all converted to magnesium hydride.

Example 12

The mill reactor was charged with 54 g. of aluminum powder containing 1% titanium metal, 24 g. of magnesium powder, 750 ml. of heptane, and 100 ml. of anhydrous ether. The mixture was milled for 2 hours at room temperature under 200 p.s.i. of hydrogen. The temperature was then raised to 125° C. and the mixture hydrogenated at 3500–4000 p.s.i. for 10 hours. All of the magnesium was hydrogenated and 22% of the aluminum was converted to magnesium aluminum hydride.

Example 13

The mill reactor was charged with 20 g. of chipped calcium metal turnings, 27 g. of atomized aluminum powder, and 600 ml. of heptane. The mixture was milled for 2 hours at room temperature under 200 p.s.i. of hydrogen pressure. The temperature was then raised to 150° C. and the reaction mixture was hydrogenated for 8 hours at 4500 p.s.i. The product contained calcium hydride, calcium aluminum hydride and some unreacted aluminum.

Example 14

The mill reactor was charged with 24 g. of magnesium powder, 54 g. of atomized aluminum powder, 25 ml. of a heptane slurry containing 3 g. of titanium trichloride, and 800 ml. of diethyl ether. This mixture was milled for 8 hours at room temperature under 200 p.s.i. of hydrogen and then was hydrogenated at 120° C. and 4000 p.s.i. for 8 hours. The reactor was cooled to 50° C., and the ether was distilled off and replaced with an equal volume of n-heptane. Analysis of the slurry showed that all of the magnesium was hydrogenated and 24% of the aluminum was converted to magnesium aluminum hydride.

What I claim and desire to protect by Letters Patent is:
1. The process of preparing an alkaline earth metal

TABLE

| Example | Metal | Grams | Catalyst | Grams | Hydrogen Pressure, p.s.i. | Reaction Temp., °C. | Reaction Time, Hrs. | Product | Percent Conversion |
|---|---|---|---|---|---|---|---|---|---|
| Control | Mg | 24 | | | 4,000 | 150 | 6 | $MgH_2$ | 18 |
| 1 | Mg | 100 | | | 3,000 | 150 | 6.5 | $MgH_2$ | 100 |
| 2 | Mg | 100 | | | 2,500 | 155–160 | 6 | $MgH_2$ | 100 |
| 3 | Mg | 100 | $TiCl_3$ | 6 | 4,000 | 150 | 1.1 | $MgH_2$ | 100 |
| 4 | Mg | 24 | $VCl_2$ | 1.25 | 3,500–4,000 | 150 | 2 | $MgH_2$ | 100 |
| 5 | Mg | 50 | Ti | 1.5 | 1,000 | 160 | 2 | $MgH_2$ | 96 |
| 6 | Mg | 24 | $CrCl_3$ | 1.25 | 3,500–4,000 | 153 | 1.5 | $MgH_2$ | 100 |
| 7 | Mg | 24 | $TiH_2$ | 1.25 | 3,400–4,000 | 150 | 0.32 | $MgH_2$ | 100 |
| 8 | Ca | 25 | | | 4,000–4,500 | 150 | 6 | $CaH_2$ | >95 |
| 9 | Mg | 35 | | | 500 / 800 | 140 / 140 | 2 / 2 | $MgH_2$ | 88 |

Example 10

The mill reactor was charged with 24 g. of chipped magnesium, 54 g. of atomized aluminum powder, and 650 ml. of dioxane which had been dried and purified by distillation from sodium aluminum hydride. The mixture was milled for 2 hours at room temperature and then reacted at 150° C. under 4500 p.s.i. of hydrogen for 13.5 hours. Analysis of the product showed that all of the magnesium was hydrogenated and 15% of the aluminum was converted to magnesium aluminum hydride.

Example 11

The mill reactor was charged with 54 g. of atomized aluminum powder, 26 g. of commercial magnesium hydride, 200 ml. of tetrahydrofuran and 700 ml. of heptane.

aluminum hydride which comprises contacting a mixture of aluminum and an alkaline earth metal with hydrogen under a pressure of about 1000 p.s.i. to about 5000 p.s.i. and at a temperature of from about 100° C. to about 200° C. in the presence of an inert, liquid, organic diluent while subjecting the reaction mixture to comminution by ball-milling during the reaction.

2. The process of preparing magnesium aluminum hydride which comprises contacting a mixture of magnesium and aluminum with hydrogen under a pressure of about 1000 p.s.i. to about 5000 p.s.i. and at a temperature of from about 100° C. to about 200° C. in the presence of an inert, liquid, organic diluent while subjecting the reaction mixture to comminution by ball-milling during the reaction.

3. The process of preparing calcium aluminum hydride which comprises contacting a mixture of calcium and aluminum with hydrogen under a pressure of about 1000 p.s.i. to about 5000 p.s.i. and at a temperature of from about 100° C. to about 200° C. in the presence of an inert, liquid, organic diluent while subjecting the reaction mixture to comminution by ball-milling during the reaction.

4. The process of claim 2 wherein at least part of the diluent is an ether.

5. The process of claim 4 wherein the process is carried out in the presence of at least a catalytic amount of titanium.

References Cited

UNITED STATES PATENTS

| | | | |
|---|---|---|---|
| 1,026,156 | 5/1912 | Ellis | 260—409 |
| 2,378,368 | 6/1945 | Alexander | 23—204 |
| 2,550,985 | 5/1951 | Finholt | 23—365 X |
| 2,553,198 | 5/1951 | Lesesne | 23—204 |
| 2,567,972 | 9/1951 | Schlesinger et al. | 23—14 |
| 2,702,234 | 2/1955 | Alexander | 23—204 |
| 2,735,820 | 2/1956 | Steiger | 23—204 X |
| 2,920,935 | 1/1960 | Finholt | 23—14 |
| 3,032,574 | 5/1962 | Ziegler et al. | 260—448 |
| 3,104,252 | 9/1963 | Radd et al. | 260—448 |
| 3,138,433 | 6/1964 | Del Guidice | 23—14 |

FOREIGN PATENTS 795,130 5/1958 Great Britain.
888,045 1/1962 Great Britain.

OTHER REFERENCES

Clasen, "Angewandte Chemie," vol. 73, pp. 322–331 (May 1961).

Hurd, "Chemistry of Hydrides," 1952, pp. 181–183.

OSCAR R. VERTIZ, *Primary Examiner.*

BENJAMIN HENKIN, MILTON WEISSMAN, MAURICE A. BRINDISI, *Examiners.*